(12) United States Patent
Aho, Jr.

(10) Patent No.: US 8,215,645 B1
(45) Date of Patent: Jul. 10, 2012

(54) FLOATING AIR SEAL FOR A TURBO MACHINE

(75) Inventor: Wilho V Aho, Jr., West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 270 days.

(21) Appl. No.: 12/781,327

(22) Filed: May 17, 2010

(51) Int. Cl.
*F16J 15/34* (2006.01)
(52) U.S. Cl. .......................... 277/370; 277/401
(58) Field of Classification Search .......... 277/370, 277/399, 401, 408
See application file for complete search history.

(56) References Cited

U.S. PATENT DOCUMENTS

| | | | | |
|---|---|---|---|---|
| 3,190,661 A | * | 6/1965 | Wahl et al. | 277/409 |
| 4,014,555 A | * | 3/1977 | Jacottet | 277/361 |
| 4,299,398 A | * | 11/1981 | Wahl | 277/336 |
| 4,534,569 A | * | 8/1985 | Ishitani et al. | 277/351 |
| 6,352,265 B1 | * | 3/2002 | Ha | 277/432 |
| 6,494,460 B2 | * | 12/2002 | Uth | 277/399 |
| 7,823,885 B2 | * | 11/2010 | Droscher et al. | 277/369 |
| 7,862,046 B2 | * | 1/2011 | Lederer et al. | 277/348 |

* cited by examiner

*Primary Examiner* — Vishal Patel
(74) *Attorney, Agent, or Firm* — John Ryznic

(57) ABSTRACT

A floating air seal to seal a lower pressure chamber from a higher pressure chamber and allow for both axial and radial shifting of the rotor with respect to the stator while maintaining the sealing capability. The floating seal includes an annular piston that slides within an annular groove formed within the stator in an axial direction with an annular flange secured to it that forms an annular manifold between the piston and the flange. The annular piston includes a plurality of feed holes that open into the annular manifold, and the annular flange includes a plurality of baffle holes that open into the annular manifold but offset from the feed holes so that Helmholtz excitations of the rotor disk do not occur. The baffle holes open into an outer annular groove that forms an air cushion against the rotor disk surface due to the air flow.

2 Claims, 13 Drawing Sheets

FLOATING AIR SEAL FOR A TURBO MACHINE

FEDERAL RESEARCH STATEMENT

None.

CROSS-REFERENCE TO RELATED APPLICATIONS

None.

BACKGROUND OF THE INVENTION

1. Field of the Invention

The present invention relates generally to a gas turbine engine, and more specifically to a seal for a rotor disk in a gas turbine engine.

2. Description of the Related Art Including Information Disclosed Under 37 CFR 1.97 and 1.98

A gas turbine engine, such as an industrial gas turbine engine, includes a compressor to deliver compressed air to a combustor that produces a hot gas flow that is then passed through a turbine to produce mechanical power. The turbine includes a number of stages or rows of rotor blades and stator vanes that form a hot gas path through the turbine. The rotor blades form a seal with a stationary part of the engine to limit egress of the hot gas flow into parts of the engine that can be thermally damaged.

FIG. 7 shows one prior art seal used in a gas turbine engine where the rotor disk includes a labyrinth seal having a number of knife edges that rotates near to a surface on the stationary casing to form a rotary seal. The knife edge seal limits the leakage of flow but does not totally block the leakage. Brush seals are also used to reduce leakage. However, brush seals make contact with the rotating part and therefore cause wear of the brush bristles. Also, brush seals do not make good seals at high rotational speeds. One major problem with this type of rotary seal used in a gas turbine engine is that the gap formed between the rotary seal can vary depending upon the engine temperatures. During engine transients, the knife edges can actually rub against the stationary seal interface and thus cause heating or damaged to the knife edges. Some complex arrangement of parts have been proposed in the prior art to limit the seal gap in these types of rotary seals in gas turbine engines.

BRIEF SUMMARY OF THE INVENTION

A rotary seal of the present invention that makes use of a floating seal that produces a cushion of film air between the rotating surface and the stationary surface that forms the seal interface. The air cushion forms a seal that prevents any leakage from one side to the other side of the seal. Also, the seal surfaces are formed by an annular ring in which the sealing interface is parallel to a plane that is normal to the rotational axis of the turbo machine so that a radial displacement of the rotating seal part with respect to the stationary seal part will not affect the seal.

The sealing member is an annular ring with a central passage to pass pressurized air to form the cushion of film air on which the annular ring floats during operation. A forward side of the annular ring forms a surface area for the pressurized air to act that forces the annular ring against the stationary seal surface. Pressurized air passing through the axial holes in the annular ring forms a cushion of air for the floating seal that also prevent mixing of the outer fluid with the inner fluid in which the floating seal separates.

DETAILED DESCRIPTION OF THE INVENTION

Figure 1:
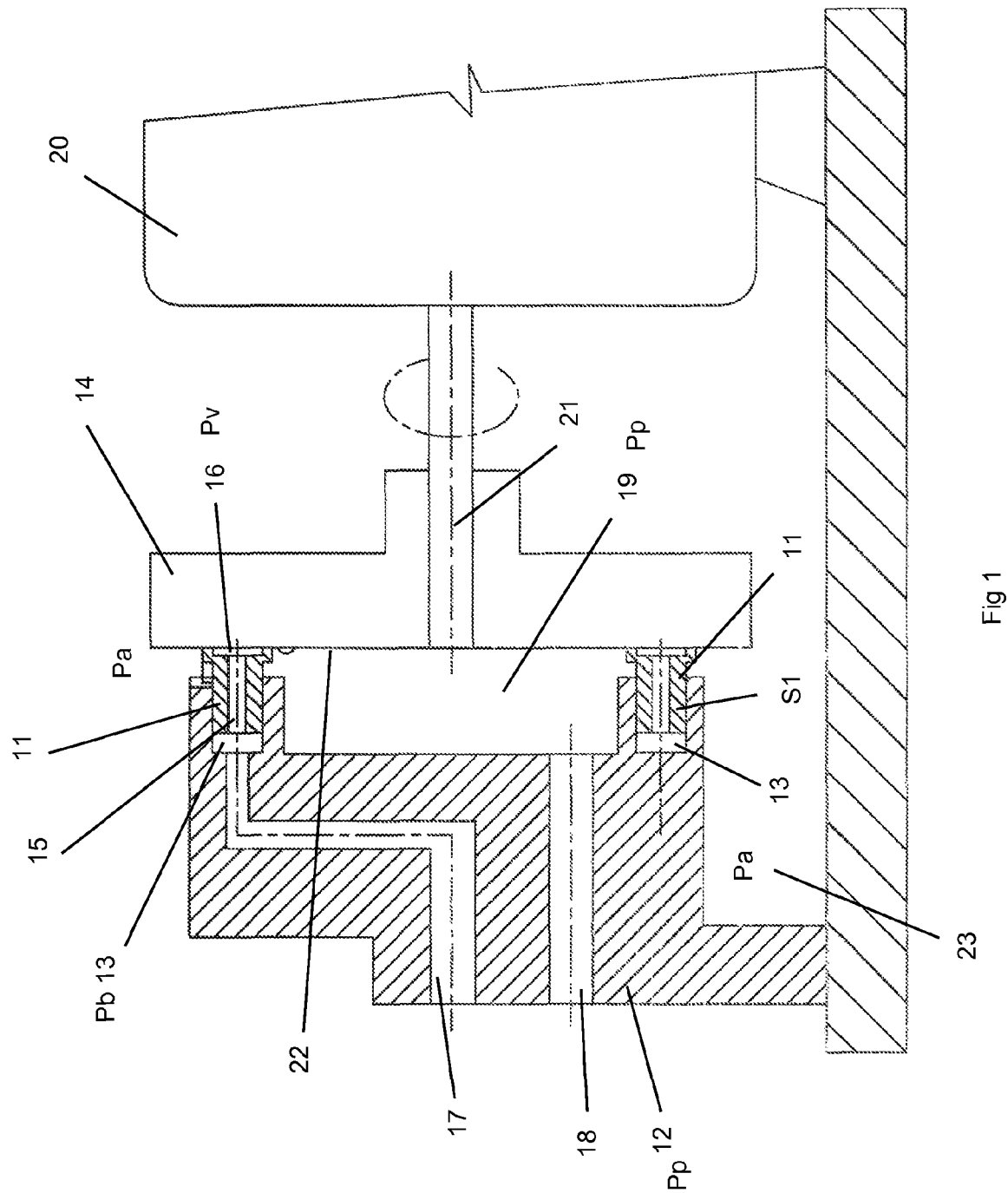
FIG. 1 shows a cross section view of the floating seal of the present invention.
Figure 2:
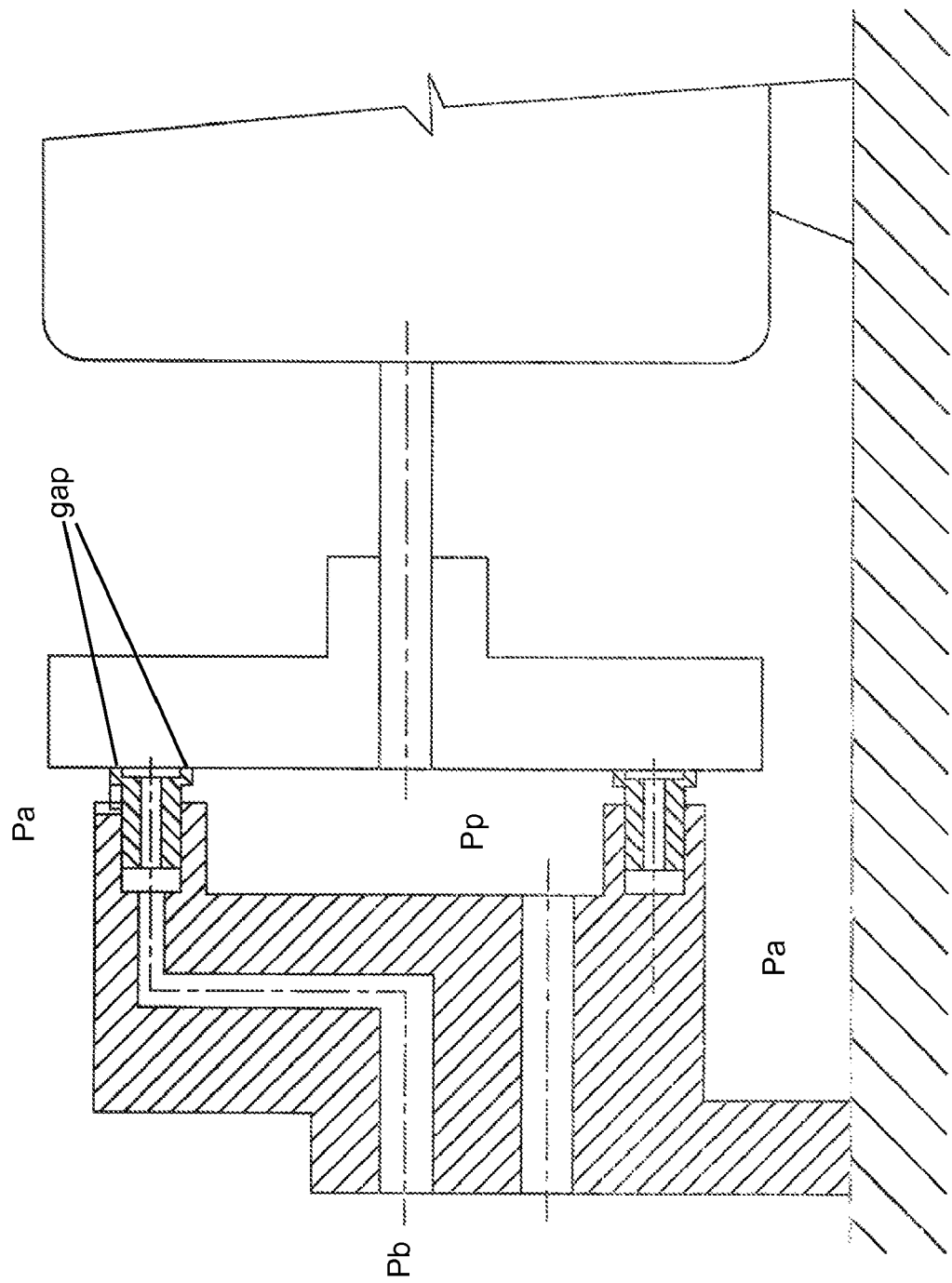
FIG. 2 shows a cross section view of the floating seal of FIG. 1.

A first embodiment of the floating seal of the present invention is shown FIG. 1 and includes floating seal 11 that slides in an axial direction within an annular groove 13 formed within a stationary housing 12. The floating seal 11 is an annular piston having a ring shape with a central passage 15 extending through the piston and opening into a cavity 16 formed on the front end. The cavity 16 is an annular cavity. A rotor 14 is rotatably driven by a motor 20 through a shaft 21. The rotor 14 includes a side 22 that forms a surface on which the floating seal forms an air cushion when in operation. The stationary housing 12 forms a pressure inner cavity 19 in which the floating seal 11 produces a seal from an outer cavity 23. The inner cavity 19 is connected to a source of pressure by a passage 18. The annular groove 13 is connected to a source of pressure through a buffer passage 17 to form a buffer pressure chamber 13 between the annular groove 13 and the rear face of the piston of the floating seal 11.

Figure 9:
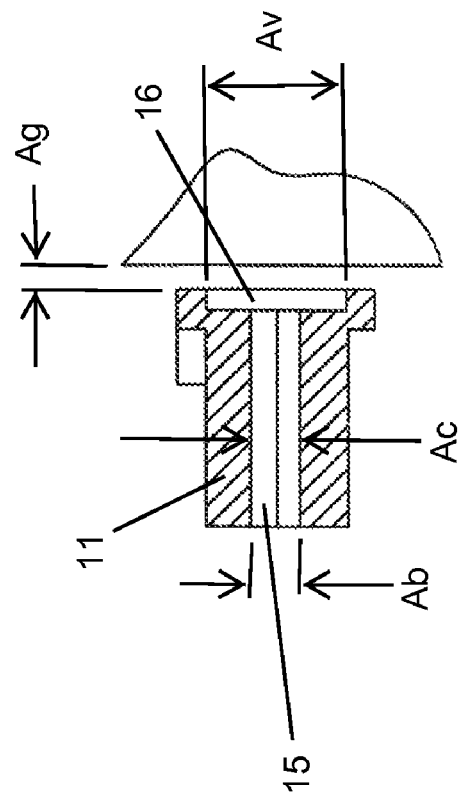
FIG. 9 shows a cross section detailed view of the floating annular piston that forms the floating seal.

The piston of the floating seal 11 is shown in more detail in FIG. 9 with the different faces that form pressure reacting surfaces for producing the air cushion that forms the seal. The piston includes the central passage 15 having a diameter Ac, a rear face with a radial height Ab, and the cavity on the front face with a radial height of Av. A gap of length Ag is formed between the side walls of the cavity 16 on the front face of the piston and the surface 22 of the rotor 14. The area Av must be slightly larger than the area Ab to provide the lift off pressure to open the gap Ag. The seal pass-through central passage 15 area Ac is sized to provide the area Ag. The floating piston ring 11 and the annular groove 13 formed within the stationary housing 12 include an anti-rotation feature that will prevent rotation of the annular piston ring 11 within the annular groove 13 but will allow the axial displacement. In the present embodiment, a slot and key is used to allow axial displacement of the annular piston ring 11 while preventing rotation of the piston ring 11 with respect to the stationary housing 12. a key can be part of the annular piston ring 11 and a slot in which the key can slide in the axial direction of the piston ring will produce this function. Other anti-rotation designs can be used that will allow for the axial displacement but prevent rotation.

A fluid pressure, such as compressed air, is applied to the buffer cavity 13 through the buffer passage 17 to produce a force acting on the rear face of the piston to move the piston forward toward the rotor surface 22. The pressure source also flows through the central passage 15 and into the cavity 16 to form an air cushion in the gap that will form. The air gap from the cushion and the net force acting on the rear face of the piston will result in the floating seal to prevent the fluid from the inner cavity and the outer cavity from mixing. The floating seal will prevent the pressure in the inner cavity 19 from leaking into the outer cavity 23. or the outer cavity 23 from leaking into the inner cavity 19. because the pressure in the buffer cavity from Pb being greater than the pressure in the inner cavity Pp and the pressure in the outer cavity Pa, the floating seal 11 will maintain a small gap with an air cushion.

Figure 7:
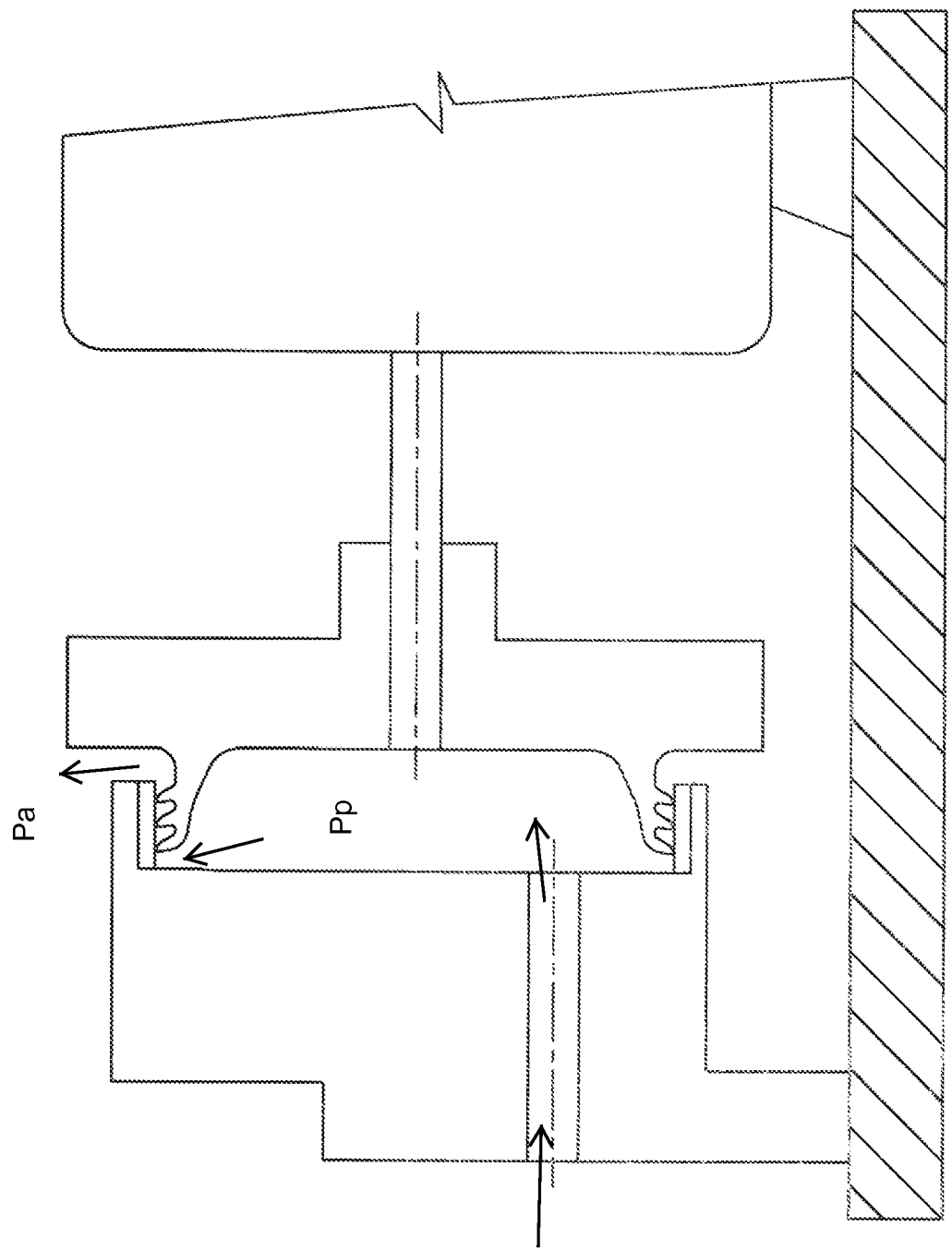
FIG. 7 shows a cross section view of a prior art labyrinth seal.

One of the main advantages of the present invention is that any radial displacement between the rotor 14 and the stationary housing 12 and the floating seal 11 will not affect the sealing capability. Since the air cushion is formed against the flat surface 22 on the rotor 14 and the flat surface 22 is perpendicular to the rotational axis of the floating seal 11, any radial displacement will not affect the seal. Thus, the floating seal will make a better seal in a gas turbine engine than the prior art seal of FIG. 7. As seen in FIG. 7, the lab seal will have a varying gap due to any radial displacement from temperature differences normal in the operation of a gas turbine engine. The seal can rub and remove material, or the gap can increase so that leakage flow across the seal is large. In the floating seal of the present invention, the only leakage is the flow of Pb air passing through the gap Ag.

Figure 3:
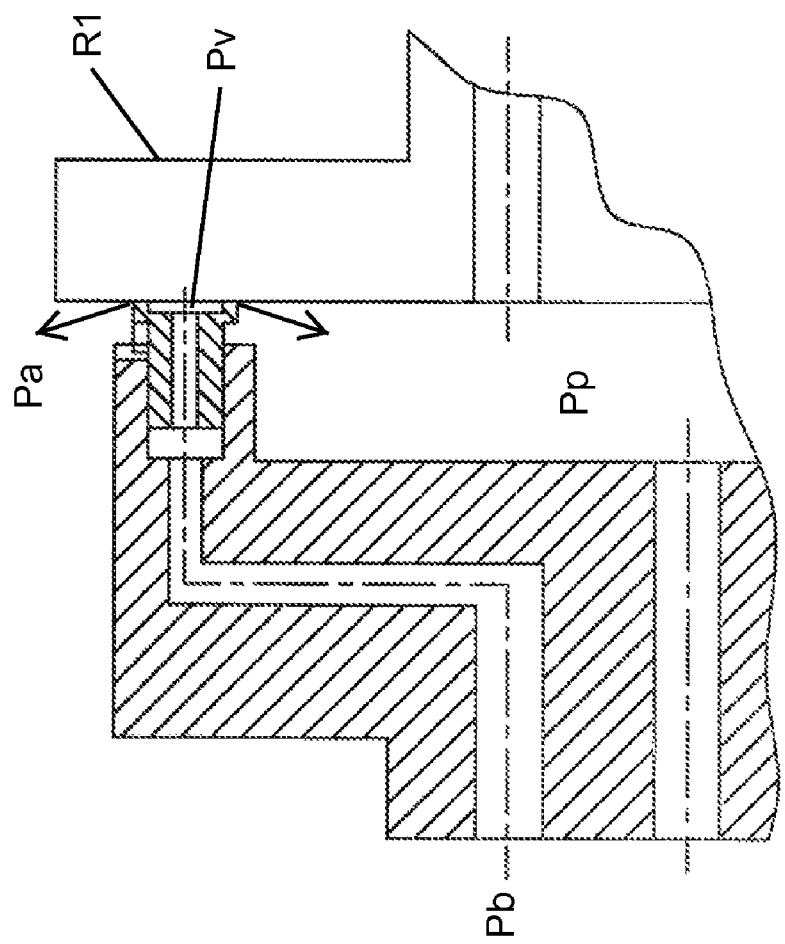
FIG. 3 shows a detailed cross section view of the floating seal of the present invention.

When pressure Pb flows into the buffer cavity 13 and acts on the rear face of the piston, a force is produced that forces the piston toward the rotor surface 22. The restriction formed by the central passage 15 allows for the fluid (air) to flow into the cavity 16 to form an air cushion in the gap between the piston and the rotor surface 22. A balancing force between the pressure in the buffer cavity 13 and the seal cavity 16 will cause the floating seal to lift off from the rotor surface and maintain the appropriate gap to produce the seal. The fluid passing through the gap causes the pressure Pb in the buffer cavity 13 to force the seal back towards the rotor surface 22. This process stabilizes at a balance between the buffer cavity 13 pressure Pb, the restrictor flow, the seal cavity 16 pressure Pv and the gap flow. See FIG. 3.

Figure 5:
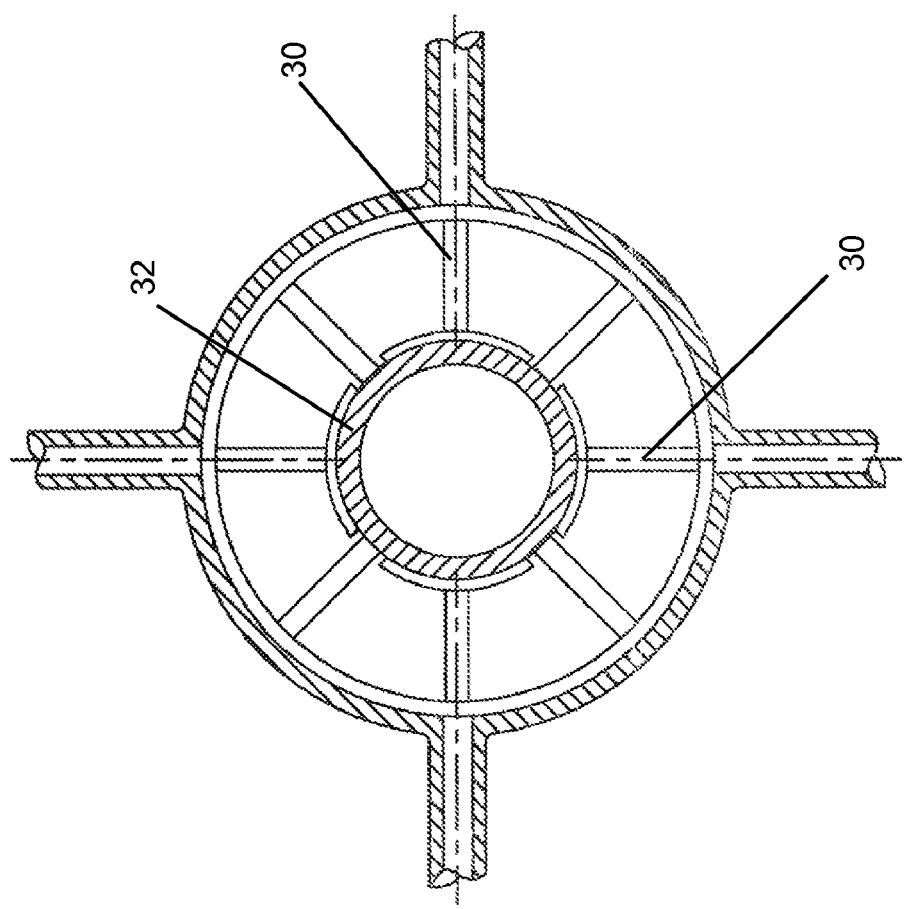
FIG. 5 shows a front view along the axis of the radial floating seal of FIG. 4.
Figure 4:
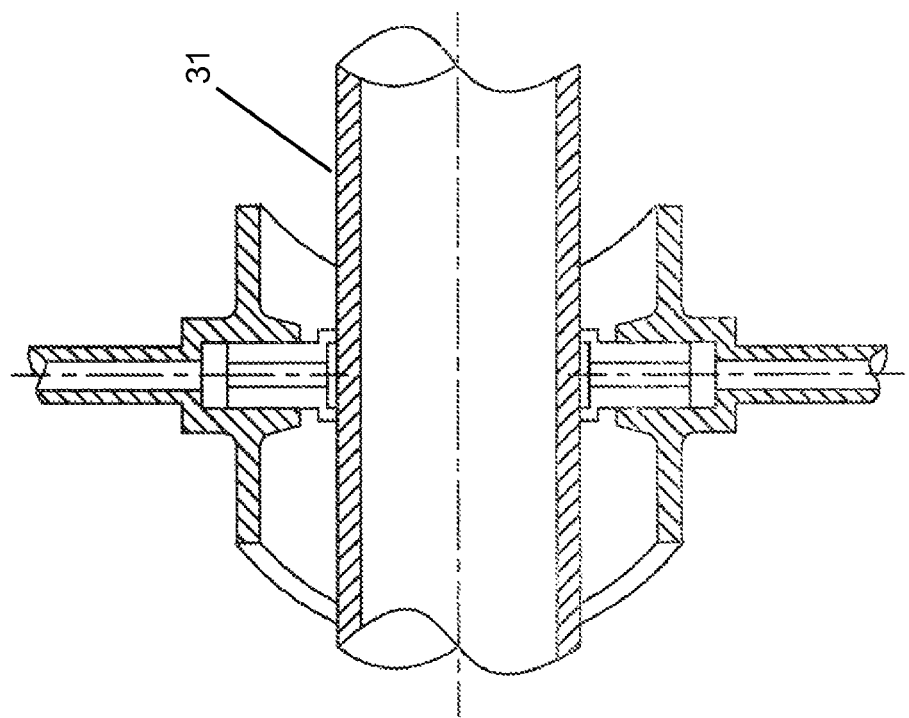
FIG. 4 shows an additional embodiment of the floating seal used in a radial application.

FIGS. 4 and 5 shows an embodiment in which the floating seal is used in a radial application instead of the axial application of FIG. 1. This floating seal is made up of segments instead of one single annular ring as in FIG. 1. The ring segments together form a full annular ring assembly but have tongue and groove connections between adjacent segments to allow for circumferential growth while maintaining a seal across the adjacent segment ends. FIG. 5 shows a front view of the seal in FIG. 4 with four segments each having a radial fluid passage 30 to supply the pressurized air on the inner seal cavity that forms a gap with an air cushion between the stationary seal and the rotating shaft 31. The radial floating seal works the same way in that the segmented pistons slide inward and outward depending upon the pressure forces established across the different surfaces of the piston.

Figure 6:
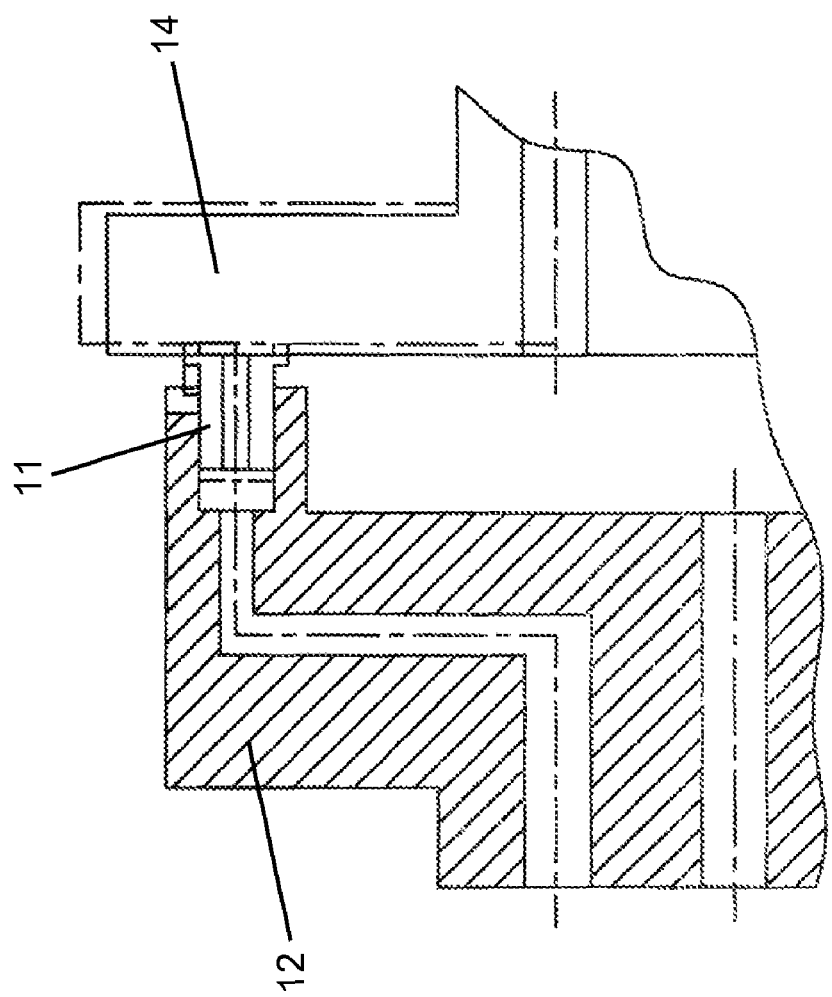
FIG. 6 shows a cross section view of the floating seal operating under thermal or rotor dynamic displacements.

FIG. 6 shows a depiction of the axial floating seal of FIG. 1 with an axial and a radial displacement (represented by the dashed lines) of the rotor 14 with respect to the stationary housing 12 that holds the floating seal piston 11. The floating seal will maintain the close clearance even with these two displacements that would in the prior art seal cause rubbing or excess leakage around the seal interface. As the rotor 14 moves in both axial and radial directions, the piston 11 will move in an axial direction within the annular groove to maintain the close clearance and thus tight seal.

Figure 8:
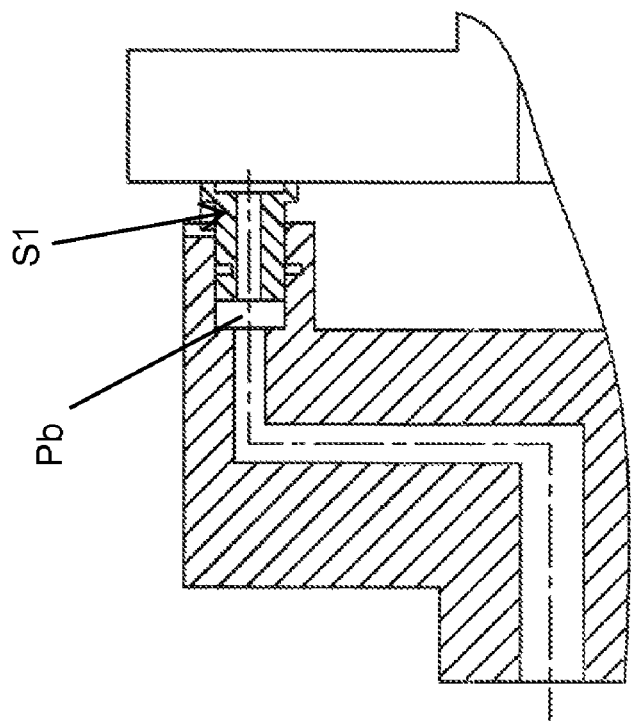
FIG. 8 shows a cross section detailed view of the floating seal.

FIG. 8 shows the axial floating seal in which regulating of the pressure Pb serves to stiffen the position of the seal Si and control the total flow through the gap Ag. In FIG. 9, the area Av must be slightly larger than Area Ab to provide lift off pressure to open the gap Ag. The seal pass-through area Ac of the central passage 15 is sized to provide the area Ag.

Figure 10:
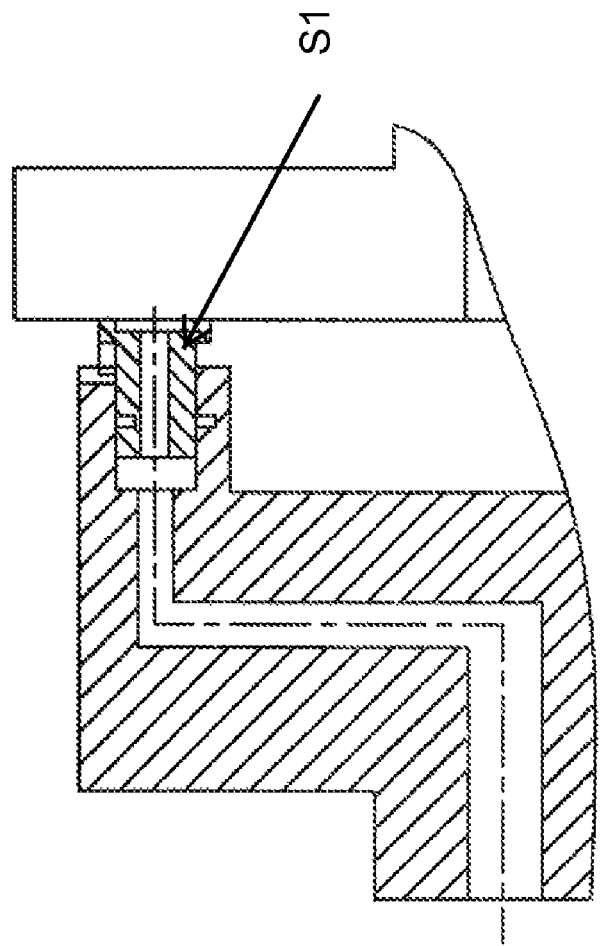
FIG. 10 shows a detailed cross section view of the annular piston with a seal to limit parasitic leakage.

FIG. 10 shows an embodiment of the axial floating seal with a piston ring or other metallic seal around the piston to reduce the parasitic leakage across the piston. For lower temperature applications, an O-ring or other elastomeric or composite material configuration can be used instead of the piston ring.

Figure 11:
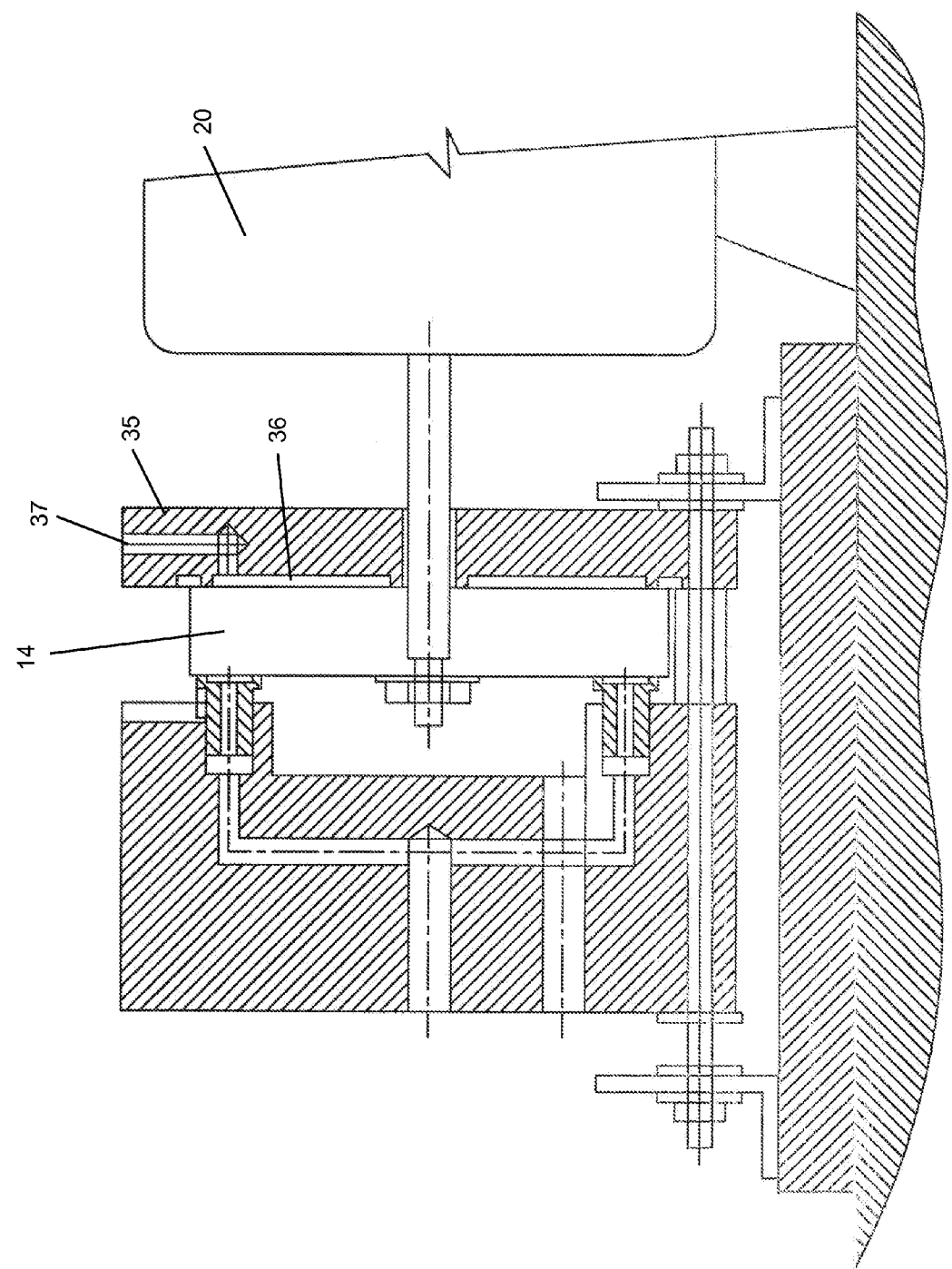
FIG. 11 shows a cross section view of the floating seal with an air loaded back plate to compensate for limited thrust capability of a motor.

FIG. 11 shows another embodiment of the axial floating seal in which the rotor 14 is supported by an air loaded backing plate 35 for limited thrust capability of the motor 20. The backing plate 35 includes a cushioning cavity 36 facing the rotor 14 that is connected through one or more passages 37 to a fluid pressure source to provide a fluid cushion against the backside surface of the rotor 14. The axial floating seal 11 remains the same as disclosed in the FIG. 1 embodiment.

Figure 12:
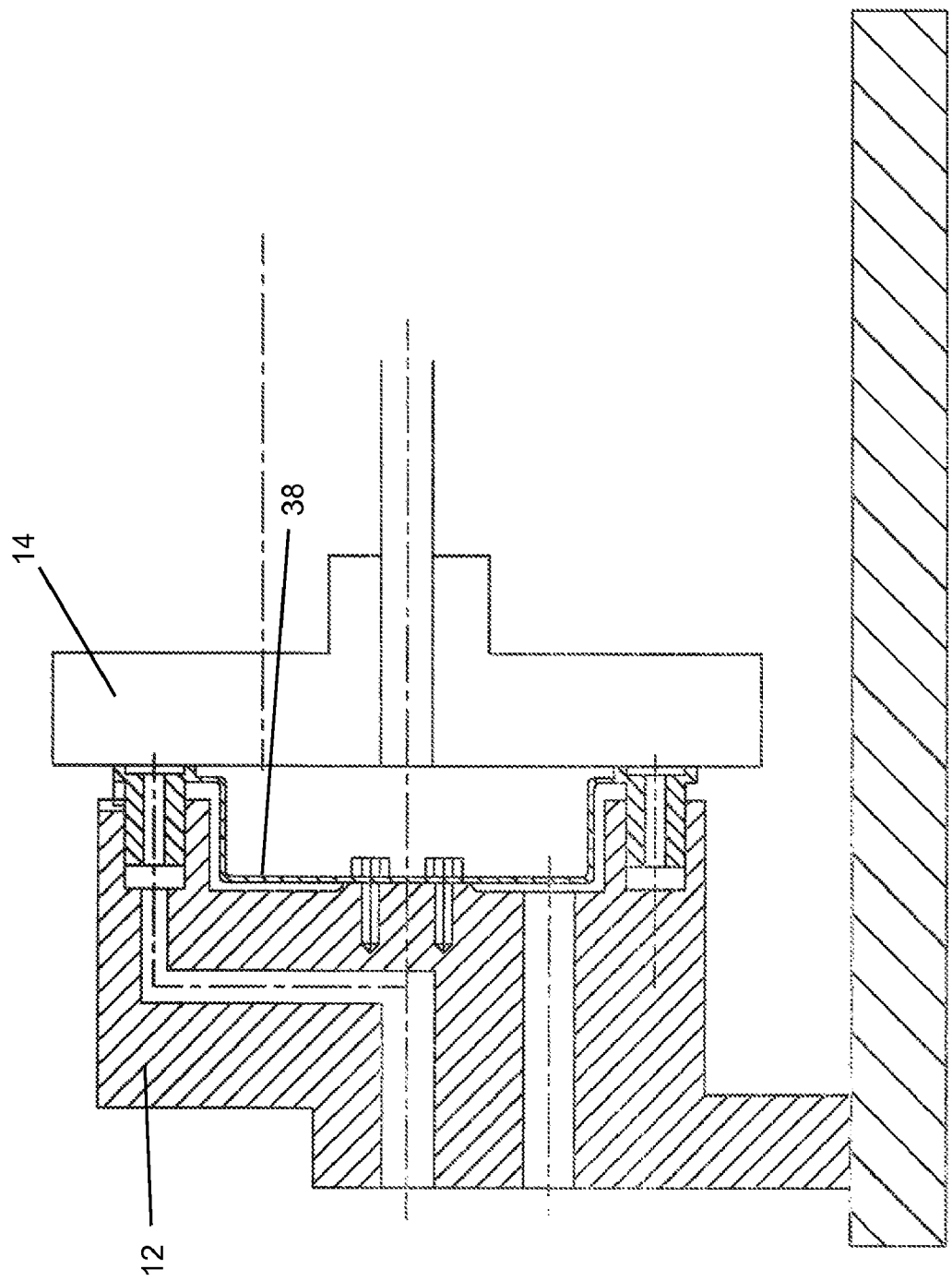
FIG. 12 shows a cross section view of the floating seal with an axial pre-positioning plate.

FIG. 12 shows an embodiment of the axial floating seal with a seal obstructer element featuring an axial pre-positioning device (positioning plate) 38 secured to the stationary housing 12 by a number of threaded bolts close to the axis on one end and secured to the piston on the other end either as a separate piece or integral with the piston. The positioning plate 38 includes an annular section with bolt holes for the bolts to secure the plate to the stationary housing, and a plurality of radial extending fingers that are fixed to the annular piston 11 and function to position the annular piston instead of allowing the annular piston to float freely. The pressure applied to the back side of the annular piston will overcome any resistance to movement that the positioning plate 38 would have on the annular piston 11.

Figure 14:
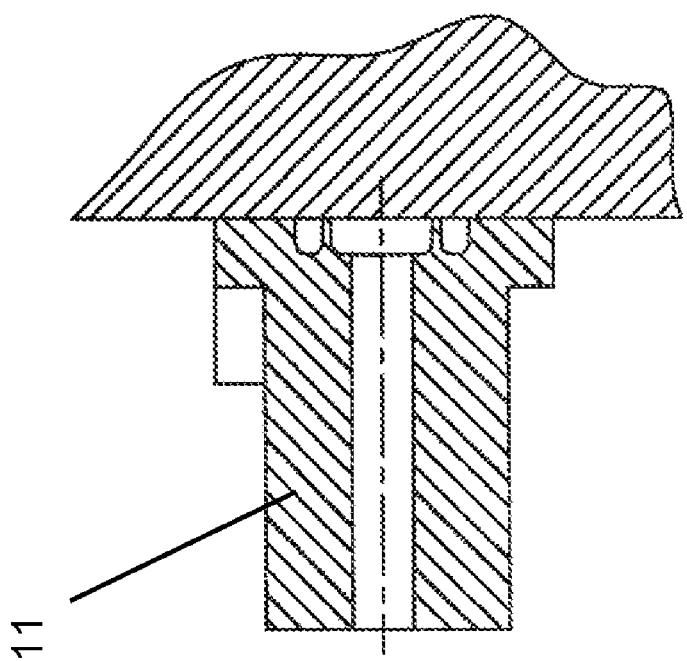
FIGS. 13 and 14 show additional embodiments of the annular piston with various gland configurations to provide damping capability from flow oscillations.
Figure 13:
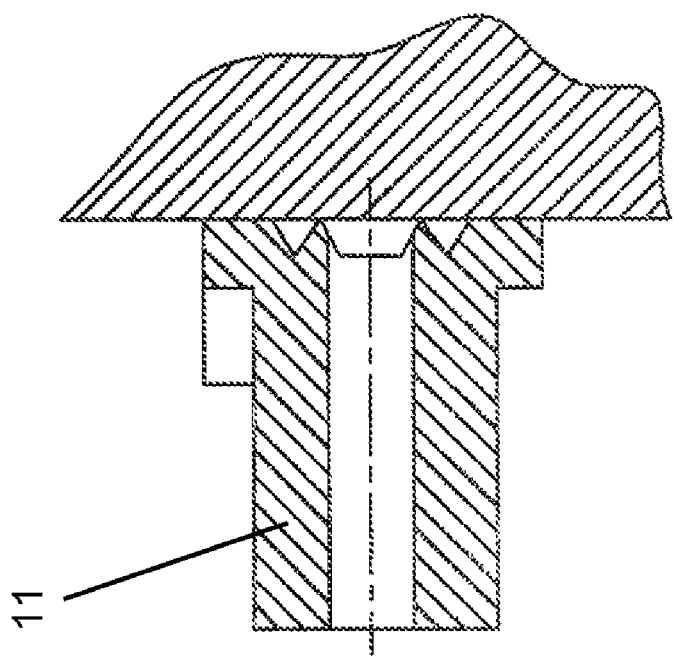

FIGS. 13 and 14 show alternate gland configurations for the piston 11 of the floating seal in which the front face includes a number of cavities that function to dampen any possible flow oscillations during operation of the floating seal.

The axial floating seal of the present invention has a number of benefits over the prior art labyrinth or brush seals. The axial floating seal provides for a replacement for conventional knife edge seals or brush seals or carbon face seals in a gas turbine engine. The seal blocks the secondary air flow from the primary gas path air flow in the gas turbine engine. The seal blocks one secondary air flow from another secondary air flow in the engine. The seal blocks any lubricating or cooling oil or fuel from entering adjacent air chambers in applications such as bearing compartments in a gas turbine engine. Also, the axial floating seal can be used in steam turbines and other turbo machinery such as a turbo pump. Other applications include an apparatus where fluids in two cavities must be isolated from each other and a buffer fluid intermixing with the fluids of each of the two cavities can be tolerated. Or, where fluids in two cavities must be isolated from each other and a buffer fluid intermixing with the fluids of each of the two cavities can be tolerated, with one or more of the enclosing cavity walls are moving or rotating with respect to the other cavity wall.

Figure 15:
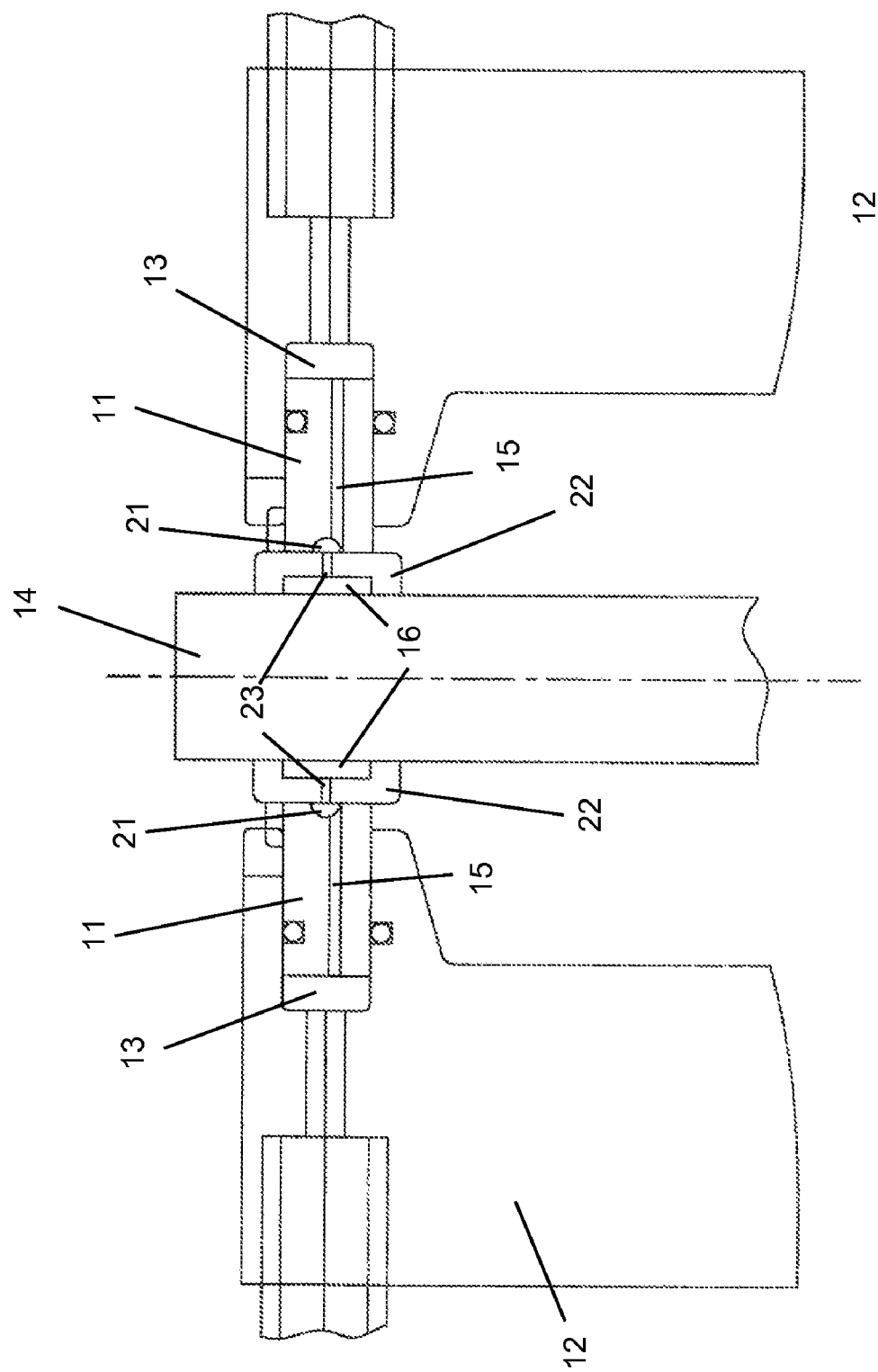
FIG. 15 shows still another embodiment of the floating air seal of the present invention with a composite floating piston that forms a number of manifolds.

FIG. 15 shows an embodiment of the floating air riding seal of the present invention in which the floating annular piston is a composite floating annular piston with the annular piston 11 having an annular flange 22 secured to the rotor disk side of the annular piston 11 so that a 360 degree annular manifold 21 is formed around the composite annular piston between the annular piston 11 and the annular flange 22. The annular flange also includes a number of baffle holes 23 that extend through the annular flange from one side to the opposite side. The annular piston 11 includes two seals—one on the annular piston 11 and another on the stationary casing 12—to provide a seal between the annular groove 13 in which the annular piston 11 moves in the axial direction. The feed holes 15 in the annular piston 11 open into the annular manifold 21. The feed holes 15 are offset from the baffle holes 23 so that vibrations induced by the flow of air through the feed holes are limited. An annular cavity 16 is still formed on the rotor disk side of the annular flange face so that an air cushion is created by the flow of air through the baffle holes 23.

Figure 16:
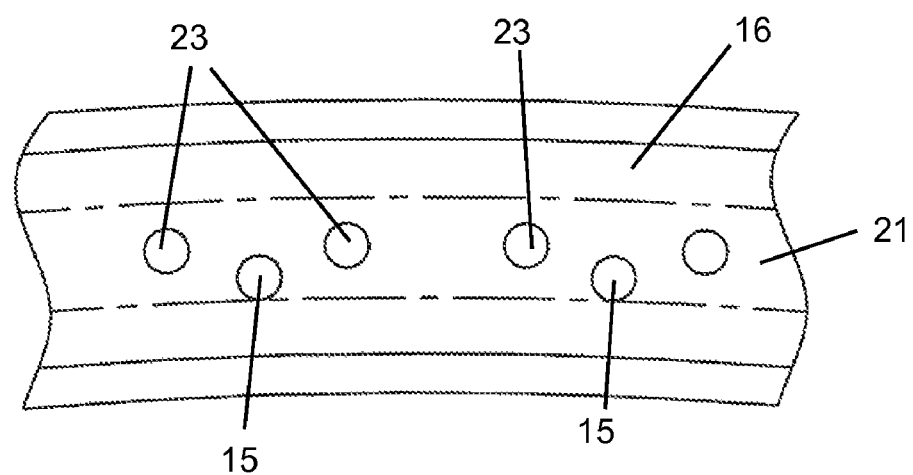
FIG. 16 shows a cross reference frontal view of a section of the annular flange and annular piston with the arrangement of feed holes and baffle holes.

The composite annular piston can be made from any suitable material, such as an acrylic annular piston 11 with an aluminum annular flange 22. The feed holes 15 are staggered to be between the baffle holes 23 to avoid the disk from "seeing' directly any Helmholtz feed hole frequency. This means that the feed holes 15 are not axial aligned with the baffle holes 23. The applicant has discovered that when the feed holes 15 are aligned with the baffle holes 23, the flow of air produces a Helmholtz induced excitation which results in the observed excessive vibrations in the rotor disk 14. The annular flange is configured as a baffle to shield the rotor disk 14 from responding to any Helmholtz excitation. In one embodiment, two baffle holes 23 are used for each feed hole 15. FIG. 16 shows a cross section frontal view of the annular flange 22 and the annular piston 11 with the feed holes 15 and the baffle holes 23 arranged with respect to the annular manifold 21. To limit the rotor disk vibration from Helmholtz excitation of the air flow through the feed holes 15. The gap flow area sets the size of the total feed hole area by a suitable factor. The total baffle hole area is set by the feed hole area by a suitable factor. With this arrangement, the rotor disk 14 can rotate as very high surface speeds (around 800 ft/sec) with the floating air seal operating effectively and floating over the rotor disk surface without excessive vibrations. The applicant has also discovered that increase a thickness of the rotor disk 14 will also add to the stability of the system by tuning the vibrations within the rotor disk to be unaffected by any structure, cavity or floater excitation.

I claim the following:

1. A floating seal comprising:

a rotor having a floating seal forming surface substantially perpendicular to a rotating axis of the rotor;

a stationary stator located adjacent to the rotor;

an annular groove formed within the stator and opening toward the floating seal forming surface of the rotor;

an annular floating piston axially movable within the annular groove of the stator;

the annular floating piston having an annular flange with an annular groove formed on the rotor side;

the annular piston having a plurality of feed holes opening into an annular manifold formed between the annular piston and the annular flange;

the annular flange having a plurality of baffle holes passing through and opening into the annular manifold;

the feed holes being offset from the baffle holes in order to reduce a Helmholtz excitation from an air flow through the feed holes and the baffle holes;

two of the baffle holes are used for each one of the feed holes;

the annular floating piston having a fluid pressure reacting surface on an opposite side to the annular groove; and, the annular floating piston having a fluid passage connecting the fluid pressure reacting surface to the annular groove to supply a fluid pressure and form a fluid cushion for the floating seal.

2. The floating seal of claim 1, and further comprising:

the annular piston is a composite annular piston with an acrylic annular piston having an aluminum annular flange secured to the annular piston.

* * * * *